Dec. 15, 1936.   A. J. ENGLAND   2,064,342
PROCESS OF ASSEMBLING THREADED ELEMENTS
Filed Feb. 12, 1935
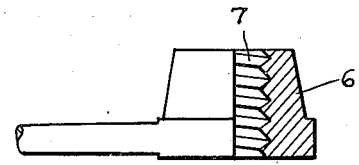
Fig. 1
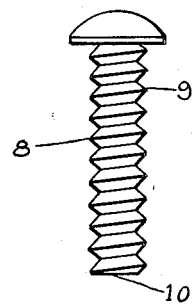
Fig. 2
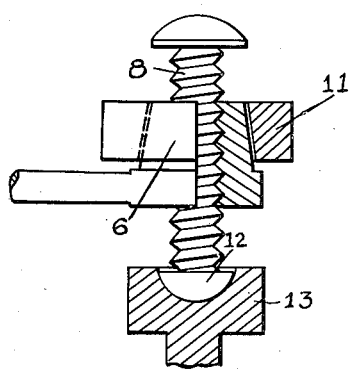
Fig. 4
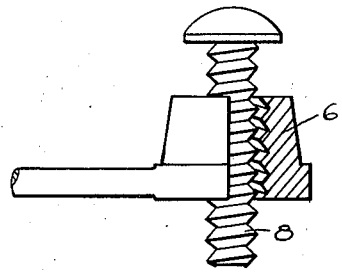
Fig. 3
Fig. 5
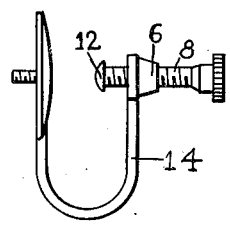
INVENTOR
AUGUST J. ENGLAND
By
Edmund H. O'Brien
ATTORNEY Patented Dec. 15, 1936

2,064,342

UNITED STATES PATENT OFFICE 2,064,342

PROCESS OF ASSEMBLING THREADED ELEMENTS

August J. England, Providence, R. I.

Application February 12, 1935, Serial No. 6,208

4 Claims. (Cl. 29—148)

My invention relates to a new and improved method of assembling. More particularly, the novel method is especially applicable to uniting two members so that after they are positioned in place with respect to each other, relative movement of one with respect to the other is readily possible.

My novel process is particularly useful for connecting two threaded members for relative movement without the necessity of laboriously screwing one member into the other. The method is especially useful in assembling small parts such as jewelry parts in which a threaded bolt is adapted for travel in an internally threaded sleeve or socket. However my invention is not limited solely to one particular application or to any specified art, nor is it limited to cases in which it is desired to unite small, relatively movable screw elements, for the process is of universal application, without regard to the size of the members assembled.

The primary advantage of the use of my method in the joinder of threaded elements resides in the considerable saving in labor attendant its use. Of course labor is an expensive item in any process of factory assembly, and an improvement which will shorten the labor incident to any manufacturing item constitutes a distinct contribution to industry.

As a consequence of the considerable saving in labor effected by my process is a resulting reduction in the time necessary to perform the assembling operation when threaded members are joined as at the factory. Previously, when it was necessary to insert a threaded male member, such as a screw, rod or bolt, into an internally threaded member such as a nut, hub, socket, or jacket, it was necessary to mesh the two co-acting screw threads by laboriously turning one member with respect to the other. After the members had been placed in a position in which they could be united by simple turning, the threading might be carried out by the use of a suitable machine, but, ordinarily, in most factories it was necessary to join the two members by hand turning. This has been, and is, especially true in cases in which the elements to be threaded are of small size, such as the tiny parts encountered in the jewelry trade. By the use of my improved process the internally threaded hub, jacket, or socket member is readily positioned in place around the threaded male member and the two sets of screw threads are caused to mesh without the necessity of laboriously turning one into the other. This is accomplished by the simple expedient of placing the threaded bolt or other male member within the internally threaded member, and then reducing the diameter of the hub, jacket, or socket by means of lateral pressure with a swaging or reducing tool until the threads of the internally threaded member are caused to mesh with those of the inserted member. Obviously this process is especially easy of application, and eliminates a step that is normally a slow and tedious operation.

While it has been the practice to unite wire ropes by positioning the two ends in juxtaposition and then swaging a clamping member or sleeve into place around the ends, this procedure has always had for its principal aim the prevention of relative movement between the sleeve and the wire ropes. Thus, it has been customary to serrate the wire rope ends in order to provide shear lugs, threads, or corrugations, but whenever threads were used in this connection they were placed on the rope ends in order to prevent relative movement of the ropes and the sleeve. The muff or sleeve, formed of soft yieldable metal, was forced with the aid of a tool into contact with the corrugations or threads in such a way that the soft metal sleeve gripped the rope ends and securely held them against any sort of movement. This process is, of course, essentially different from my process in which the members are united so that relative movement is not only possible, but takes place readily and easily upon the turning of the bolt in the threaded hub.

I am also familiar with constructions in which a fitting is attached to a high pressure hose by swaging, as well as those constructions which employ a soft extrusible sleeve within a harder, but flexible, outer member. All these arrangements of the prior art yield an assembled unit which is rigid, and in which no part is movable with respect to any other. The use of my process, on the other hand, permits the two members comprising the completed assembly to be readily screwed into and out of each other.

My invention can be more fully described by reference to the annexed drawing wherein:

Fig. 1 is a view, partly in elevation and partly in cross-section, of an internally threaded hub member into which a bolt is to be threaded to form a complete assembly.

Fig. 2 is an elevational view of a second threaded member, a bolt, which is adapted for insertion in the internally threaded member of Fig. 1.

Fig. 3 is a view, partly in section and partly in elevation, showing the relative positions of the two screw-threaded members after the completion of the first step of my process.

Fig. 4 is a view, partly in section and partly in elevation, showing the relative positions of the two threaded members after the swaging step is completed.

Fig. 5 is an elevational view of an ear wire of the clamp style used in the jewelry trade which has been assembled by the use of my method.

Referring particularly to the drawing, the threaded hub 6 is provided with internal screw threads 7 as shown. This member is formed of relatively soft and flexible metal so that it may be reduced in internal diameter by the application of a swaging, bending, or compressing tool.

The threaded bolt 8 is provided with screw threads 9 which have a form and pitch similar to those formed in the hub. The diameter of the cylindrical shank 10 of the bolt 8 is slightly less than the diameter of the threaded bore in the hub member.

The steps comprising my process are illustrated in Figs. 3 and 4 of the drawing. The externally threaded bolt 8 is dropped into the threaded bore in the hub 6, the operation being easily performed because of the slight difference between the diameters of the two members. Since the diameter of the bolt is less than that of the threaded bore in the hub, the bolt can be slipped within the hub. The threaded portions are brought opposite each other, as shown, and a swaging or reducing tool 11 is applied to the external portion of hub 6.

The internal diameter of hub 6 is then reduced so that the screw threads of the hub are forced into mesh with those in the bolt 8 by the application of pressure to the hub by means of swaging tool 11. As shown in Fig. 4 the respective threads are brought into contact, thus completing the assembly. The two joined members, 6 and 8, are now positioned for relative movement, the bolt 8 being readily screwed into or out of the hub 6.

If desired, an enlarged end portion 12 may be formed on the end of the bolt 8, in order to prevent its complete withdrawal from the threaded hub 6. As shown in Fig. 4 this may be accomplished by the application of a second metal bending or swaging tool 13 to the end of the bolt, and the formation of the enlarged end by the application of pressure to the swage or other tool 13.

Although the method herein described is particularly useful in the jewelry trade, for the production of an ear wire of the clamp type as shown in Fig. 5, it is apparent that my invention is not limited to any particular trade nor to the manufacture of any specified article. The numeral 14 represents the wire of the complete article shown in Fig. 5 and it is apparent that my invention has been illustrated with the manufacture of an ear wire of the clamp style in mind. The embodiment shown in the drawing is to be construed as merely illustrative and not restrictive however.

My process for assembling threaded elements for relative movement without the necessity for slow and laborious threading is of broad general application. It is not to be limited to any one particular use because of any application set forth herein as illustrative of its use, and is to be limited solely by the scope of the appended claims.

I claim:

1. The method of producing an assembled, axially relatively adjustable, bolt and nut structure provided with free-running, meshed screw threads, comprising: providing a bolt with a unidirectional helical thread, slipping, upon the threaded bolt shank, a malleable nut blank having a preformed bore therethrough the diameter of which bore is as great as the overall diameter of said threaded bolt shank, and finally bodily constricting said blank, upon said unidirectionally threaded shank utilized as a die, to an extent sufficient to effect permanent inward distortion of the wall of said bore into complementary, snugly-meshed, free-running, screw-threaded engagement with said helically threaded bolt.

2. The method of producing an assembled bolt and nut structure provided with free-running, meshed screw threads, comprising: providing a bolt with a helically threaded shank, axially slipping, upon said threaded shank, a malleable nut blank having a preformed bore therethrough provided with an internal thread of the same pitch but greater diameter than the thread of said shank, and finally bodily constricting said blank, upon said threaded shank utilized as a die, to an extent sufficient to distort the internal thread of said nut blank into permanent threaded registry and free-running interengagement with the thread of said bolt shank.

3. The method of producing an assembled, axially relatively adjustable bolt and nut structure provided with free-running, meshed screw threads, comprising: providing a bolt with a unidirectional helical thread, axially slipping, upon the threaded bolt shank, a malleable frusto-conical nut blank having a preformed bore therethrough the diameter of which bore is as great as the overall diameter of said threaded bolt shank, and finally axially swaging said frusto-conical nut blank to radially constrict the same, upon said unidirectionally threaded shank utilized as a die, and permanently deform the wall of said bore into complementary, snugly-meshed, free-running, screw-threaded engagement with said helically threaded bolt.

4. The method of producing an assembled bolt and nut structure provided with free-running, meshed screw threads, comprising: providing a bolt with a helically threaded shank, applying, upon an intermediate portion of said threaded shank, a malleable frusto-conical nut blank of less length than said threaded shank and having an axial bore therethrough the diameter of which bore is as great as the overall diameter of said shank, then heading over the free end of said threaded shank and simultaneously axially swaging said frusto-conical blank, upon said intermediate portion of said threaded shank utilized as a die, to effect permanent constriction of said bore into complementary, snugly-meshed but free, screw-threaded engagement with said threaded shank inward of the headed free end thereof.

AUGUST J. ENGLAND.